US 8,230,256 B1

(12) United States Patent
Raut (10) Patent No.: US 8,230,256 B1
(45) Date of Patent: Jul. 24, 2012

(54) METHOD AND APPARATUS FOR ACHIEVING HIGH AVAILABILITY FOR AN APPLICATION IN A COMPUTER CLUSTER

(75) Inventor: Yojana Raut, Pune (IN)

(73) Assignee: Symantec Corporation, Mountain View, CA (US)

( * ) Notice: Subject to any disclaimer, the term of this patent is extended or adjusted under 35 U.S.C. 154(b) by 241 days.

(21) Appl. No.: 12/134,723

(22) Filed: Jun. 6, 2008

(51) Int. Cl.
*G06F 11/00* (2006.01)

(52) U.S. Cl. .................. 714/13; 714/4.11; 714/38.1

(58) Field of Classification Search .......... 714/11, 714/13, 4, 38, 4.11, 38.1
See application file for complete search history.

(56) References Cited

U.S. PATENT DOCUMENTS

| | | | | |
|---|---|---|---|---|
| 5,852,724 A * | 12/1998 | Glenn et al. | ................ | 709/239 |
| 5,893,140 A * | 4/1999 | Vahalia et al. | ................ | 711/118 |
| 6,859,889 B2 * | 2/2005 | Matsuura et al. | ............ | 714/6.32 |
| 6,922,791 B2 * | 7/2005 | Mashayekhi et al. | ............. | 714/4 |
| 7,543,174 B1 * | 6/2009 | van Rietschote et al. | ......... | 714/4 |
| 7,814,364 B2 * | 10/2010 | Sankaran et al. | ............ | 714/4.12 |
| 2005/0021574 A1 * | 1/2005 | Miller et al. | .................. | 707/204 |
| 2005/0108593 A1 * | 5/2005 | Purushothaman et al. | ....... | 714/4 |
| 2005/0193245 A1 * | 9/2005 | Hayden et al. | .................. | 714/13 |
| 2005/0289540 A1 * | 12/2005 | Nguyen et al. | ..................... | 718/1 |
| 2006/0155912 A1 * | 7/2006 | Singh et al. | ....................... | 711/6 |
| 2007/0220323 A1 * | 9/2007 | Nagata | ............................. | 714/13 |

OTHER PUBLICATIONS

"Veritas Cluster Server Implementation Guide," VMware ESX, 5.0, Copyright 2007 Symantec Corporation, pp. 1-212.
"Veritas Cluster Server Administrator's Guide," Windows 2000, Windows Server 2003, 5.0, Copyright 2007 Symantec Corporation, pp. 1-758.
"Virtual Machine and Server Consolidation Software Solutions—Disaster Recovery," PlateSpin, Copyright 2008 Novell, Inc.
Roudebush, Bob, "HA/DR of Physical and Virtual Environments Using VMware ESX Server and Double-Take for Virtual Systems," WMWORLD 2006.

* cited by examiner

*Primary Examiner* — Philip Guyton
(74) *Attorney, Agent, or Firm* — Campbell Stephenson LLP (57) ABSTRACT

A method and apparatus for achieving high availability in a computer cluster is provided. In one embodiment, a method for failing over a software application to a virtual machine from a physical computing environment comprises processing at least one virtual machine file at a backup computer, wherein the at least one virtual machine file is preconfigured with a software application that is hosted by a computer cluster and in response to an occurrence a fault at the computer cluster, accessing the at least one virtual machine file to operate the software application.

20 Claims, 4 Drawing Sheets

METHOD AND APPARATUS FOR ACHIEVING HIGH AVAILABILITY FOR AN APPLICATION IN A COMPUTER CLUSTER

BACKGROUND

1. Field of the Invention

Embodiments of the present invention generally relate to techniques for disaster recovery and, more particularly, to a method and apparatus for achieving high application availability.

2. Description of the Related Art

A computing environment may include a computer cluster (e.g., a plurality of servers) that hosts critical software applications. Administrators of the computing environment desire the continuous and uninterrupted operation of such critical software applications. A fault could result in a considerable loss of performance, time and/or resources. Hence, the computing environment employs a disaster recovery technique to prevent such losses and/or achieve high availability. The disaster recovery technique ensures that all the mission critical applications run uninterruptedly at all times. When an application fault occurs, the application is failed over from one server to another server in the computer cluster. Furthermore, when the entire computer cluster is down, the application is recovered at a disaster recovery site.

Current disaster recovery techniques require that a physical computing environment at the disaster recovery site be similar to the physical computing environment at the primary site. In other words, a number of physical machines are required to be operational at the disaster recovery site in order to take over for the primary site during a failure. As a result, such an infrastructure costs a significant amount of money. Furthermore, the number of physical machines at the disaster recovery site needs to be powered on at all times.

Clustering software (e.g., VERITAS Cluster Server (VCS)) may run in a virtual machine and be ready for disaster recovery. However, the virtual machine needs to be up all the time to be ready to take-over in case of disaster. As a number of software applications and/or a number of computer clusters in the physical (production) environment increases, a number of virtual machines that are required to be ready for disaster recovery also increases. The clustering software operating within each virtual machine may establish a heartbeat within the same computer cluster even though the virtual machines residing on a same, physical server. Overall, such a disaster recovery technique increases memory and network bandwidth usage.

In addition, virtualization technologies may be utilized to reduce the number of physical machines required at the disaster recovery site. However, such virtualization technologies require a physical to virtual conversion of one or more physical machines of the physical computing environment into virtual machine files for one or more virtual machines, which consumes a significant amount of resources (e.g., network bandwidth, processing time and the like). Furthermore, the current disaster recovery techniques may need to update the virtual machine files at the disaster recovery site with current data.

Accordingly, there is a need in the art for method and apparatus for achieving high availability for an application in a computer cluster using virtualization without the need for a physical to virtual conversion. Furthermore, such a method and apparatus reduces the consumption of various computer resources, such as network bandwidth and computer memory.

SUMMARY OF THE INVENTION

Embodiments of the present invention comprise a method and apparatus for achieving high availability for an application in a computer cluster. In one embodiment, the method comprises processing at least one virtual machine file at a backup computer, wherein the at least one virtual machine file is preconfigured with a software application that is hosted by a computer cluster and in response to an occurrence a fault at the computer cluster, accessing the at least one virtual machine file to operate the software application.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
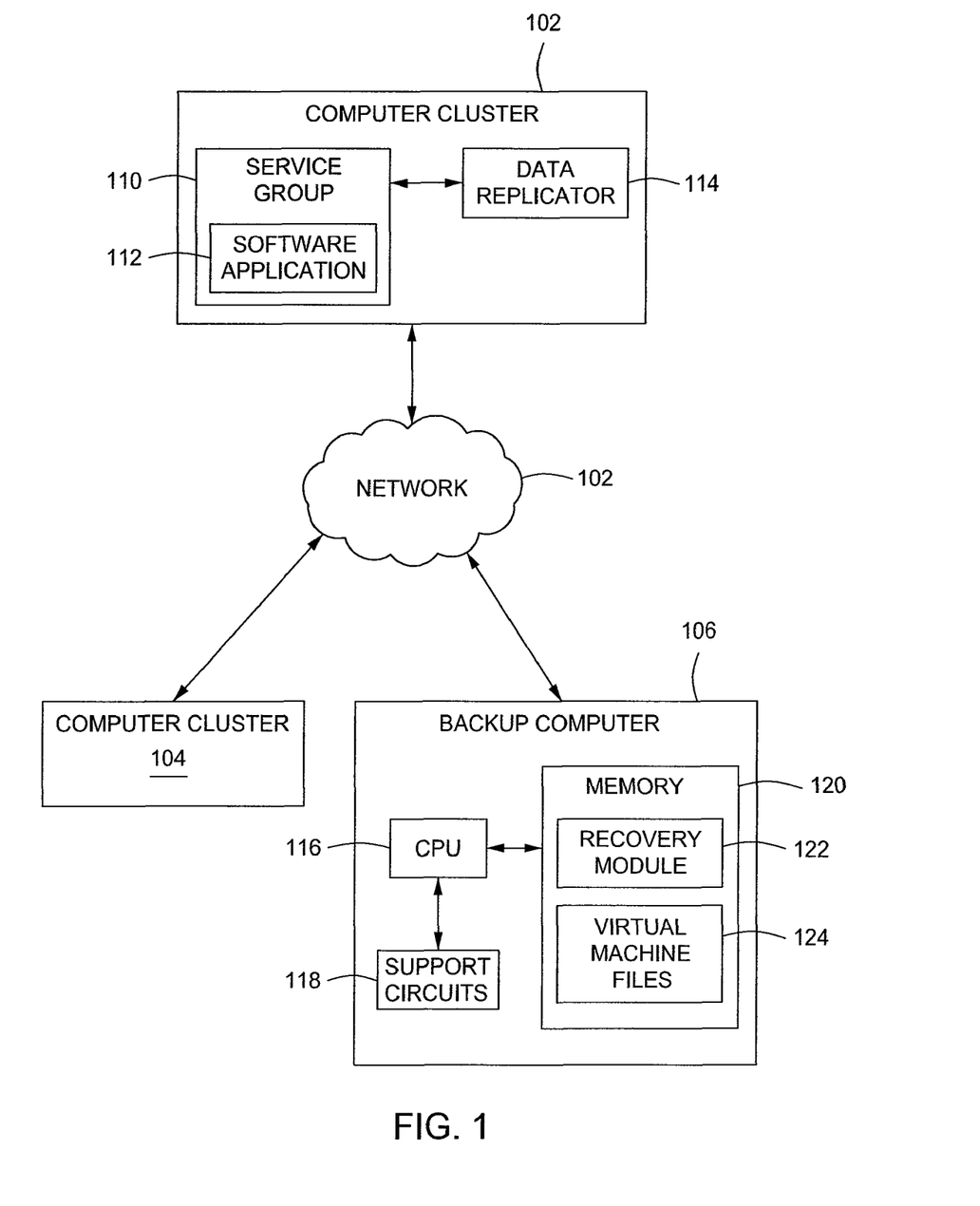
FIG. 1 is a block diagram of a system for failing over a software application to a virtual machine from a physical computing environment in accordance with one or more embodiments of the present invention.

FIG. 1 is a block diagram of a system 100 for failing over a software application to a virtual machine from a physical computing environment according to one embodiment. The system 100 comprises a computer cluster 102, a computer cluster 104, and a backup computer 106, each coupled to each other through a network 108.

The computer cluster 102 comprises various resources, such as one or more servers and shared storage devices for managing one or more critical software applications. The one or more servers may host the one or more critical software applications for a client computer. The computer cluster 104 is similar to the computer cluster 102 as described above. In one embodiment, the computer cluster 102 and the computer cluster 104 may use different platforms (e.g., different operating systems). For example, the computer cluster 102 may comprise a MICROSOFT WINDOWS server and the computer cluster 104 may comprise a LINUX server. Furthermore, the computer cluster 102 comprises a service group 110 and a data replicator 114.

The backup computer 106 is any type of computing device (e.g., laptop, desktop, Personal Desk Assistant (PDA)), such as those generally known in the art. In one embodiment, the backup computer 106 generates one or more virtual machines for the computer cluster 102 and/or the computer cluster 104 during a failover. In one embodiment, the backup computer 106 is a VMWARE ESX server. The backup computer 106 includes a central processing unit (CPU) 116, various support circuits 118, and a memory 120. The CPU 116 may comprise one or more commercially available microprocessors or microcontrollers that facilitate data processing and storage.

The support circuits 118 facilitate the operation of the CPU 116 and comprise at least one of clock circuits, power supplies, cache, input/output circuits, and the like. The memory 120 comprises at least one of read only memory (ROM), random access memory (RAM), disk drive storage, optical storage, removable storage, and the like. The memory 120 includes a recovery module 122 and one or more virtual machine files 124.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure such as Ethernet, WiFi, WiMax, General Packet Radio Service (GPRS), and the like.

In one embodiment, the service group 110 (e.g., a VERITAS CLUSTER SERVER (VCS) service group) comprises one or more hardware and/or software resources of the physical computing environment that are required to provide the one or more client computers with access to a software application 112. The software application 112 is any critical application hosted by the computer cluster 102. The service group 110 enables control over one or more of the hardware and software resources of the software application as a single unit. The service group 110 may be used by the computer cluster 102 to manage the software application 112. In order to achieve high availability for the software application 112, the one or more hardware and/or software resources of the service group 110 may be provided by the backup computer 106 according to one embodiment. Upon an occurrence of a fault, the one or more hardware and software resources of the service group 110 may not fail over individually; rather, the service group 110 fails over to the virtual machine files 124 in entirety.

According to various embodiments of the present invention, the data replicator 114 processes data (e.g., recent data) associated with the software application 112. In one embodiment, the data replicator 114 comprises software code (e.g., firmware) on a controller (e.g., microcontroller) for a storage array. In one embodiment, the data replicator 114 collects the data associated with the software application 112 and communicates such data to the backup computer 106. The data replication 114 mirrors or copies LUNsi from a primary storage array to a backup storage array. As such, the data replicator 114 may be a component of a hardware-based replication solution (e.g., EMC Symmetrix Remote Data Facility (SRDF), HP TrueCopy, VERITAS Volume Replicator) that operates with specific configurations of storage arrays (e.g., COMPAQ Data Replication Manager for COMPAQ StorageWorks hard drive disk arrays).

In another embodiment, the data replicator 114 cooperates with a corresponding, similar hardware-replication component on a storage array coupled with the backup computer 106 to replicate a primary LUN (Logical Unit Number) that comprises the data associated with the software application 112. As such, the corresponding hardware-replication component stores such data in the backup storage array. On a failover, a backup LUN that comprises such data is mounted and the replicated data is provided to the one or more virtual machines. On a failback, any recent data is replicated back to the primary LUN in order to synchronize the data associated with the software application 112.

The service group 110 and a service group comprising a virtual machine of the one or more virtual machines form a global service group (e.g., a VERITAS CLUSTER SERVER (VCS) global service group as used in VCS for VMWARE ESX, WINDOWS, LINUX and/or the like) between the computer cluster 102 and the backup computer 106. As a result, the computer cluster 102 and the backup computer 106 form a global cluster (e.g., a VCS global cluster). Generally, the global cluster couples two or more computer clusters at different locations. If a software application (e.g., the software application 112) or a system fails within a local computer cluster, the software application is migrated to another system within the same local computer cluster (e.g., the computer cluster 102). If the entire computer cluster fails, the software application is migrated to a system in another computer cluster (e.g., redirected to the virtual machine files 124 at the backup computer 106 as explained further below). Hence, the global cluster may require replicating shared data to the backup computer 106 in order to achieve high availability for the software application 112.

The virtual machine files 124 may be preconfigured with one or more computer resources. In one embodiment, a system (cluster) administrator preconfigures the virtual machine files 124 to generate the virtual machine for operating the software application 112. In another embodiment, the virtual machine files 124 may be preconfigured with installations of one or more software packages, such as an operating system or the software application 112. For example, the virtual machine files 124 may be preconfigured with an installation of an ORACLE database in order to generate a virtual machine for operating an ORACLE database application. The recovery module 126 uses the virtual machine files 124 to create a service group that comprises the virtual machine as well as any resource required for operating the software application 112. The preconfigured virtual machine files 124 enable the high availability of the software application 112 without the need to perform a physical to virtual conversion from the computer cluster 102 to the one or more virtual machines at the backup computer 106.

According to various embodiments of the present invention, the recovery module 122 accesses the virtual machine files 124 to generate one or more virtual machines to operate the software application 112 in response to the fault at the computer cluster 102. The recovery module 122 may be a component of clustering software, such as VERITAS SERVER CLUSTER. In one embodiment, the recovery module 122 mounts the virtual machine files 124 to run the one or more virtual machines. During a failover of the software application, the recovery module 122 mounts a backup LUN to provide access to the replicated data. Furthermore, the recovery module 122 redirects the user of the client computer to resume operation of the software application 112 on the backup computer 106. In one embodiment, the fault may be related to the software application 112, the client computer and/or the computer cluster 102.

The virtual machine files 124 comprises various files for representing the one or more virtual machines (e.g., .VHD, .VMDK, .VMX, .V2I files and/or the like) According to various embodiments of the present invention, the virtual machine files 124 are configured to represent the service group 110 (e.g., one or more hardware and/or software resources) for operating the software application 112. In one embodiment, one or more portions of the virtual machine files 124 are mapped to one or more portions of the service group 110. For example, data storage space within the service group 110 is mapped to data storage space within the virtual machine files 124. In one embodiment, the virtual machine files 124 are mounted to generate one or more virtual machines that function as the service group 110 for the software application 112 (i.e., produce the same physical computing environment at the computer cluster 102). The one or more virtual machines and the service group 110 may form a global service group where the one or more virtual machines are used as a service group through which the operation of the software application 112 is resumed during a fail over.

The data replicator 114, the recovery module 122 and the virtual machine files 124 cooperate to achieve high application availability for the software application 112. In operation, the recovery module 122 mounts the virtual machine files 124 to generate one or more virtual machines for resuming the operation of the software application 112 for a client computer associated with the computer cluster 102 in response to a fault within the computer cluster 102. The system administrator configures the virtual machine files 124 to represent a physical environment for running the software application 112 during a failover of the software application 112 at the computer cluster 102.

Furthermore, the recovery module 122 may generate a plurality of virtual machines from the virtual machine files 124 in order to provide the software application 112 to a plurality of client computers of the computer cluster 102. As such, the software application 112 may need to be installed only once onto the virtual machine files 124 if the plurality of virtual machines are preconfigured with equivalent computer resources, such as a same operating system. Alternatively, the plurality of virtual machines may be preconfigured with different computer resources, such as different operating systems. Hence, the plurality of virtual machines for the software application 112 may comprise a first virtual machine associated with a first operating system and a second virtual machine associated with a second operating system. Consequently, the first virtual machine may be used in response to fault at the computer cluster 102 while the second virtual machine may be used in response to a fault at the computer cluster 104.

By the way of example and not as a limitation, the software application 112 may be an ORACLE database application. The ORACLE software application is associated with a VCS service group (e.g., the service group 110) within a primary computer cluster (e.g., the computer cluster 102) that comprises various computer resources, which are necessary to provide the ORACLE database application to a client computer. The backup computer 106 may be a backup computer cluster in which the virtual machines file 124 are used to generate a virtual machine for operating the ORACLE database application. The virtual machine may be configured with same or similar computer resources (e.g., same operating system, networking components, storage devices and/or the like) as the VCS service group. In another embodiment, the virtual machine may be configured with different computer resources as the VCS service group. In one embodiment, the virtual machine and the VCS service group form a VCS global service group. Accordingly, if a fault occurs at the primary computer cluster, the ORACLE database application fails over to the backup computer cluster in which the client computer is redirected to the virtual machine with the ORACLE database application to resume operation without interruption.

As an example, an ORACLE database application and a MICROSOFT EXCHANGE server application are software applications hosted by the primary computer cluster, such as the computer cluster 102. Each hosted software application is associated with a corresponding VCS service group (e.g., the service group 110 within the computer cluster 102) that comprises various computer resources, which are necessary to provide each hosted software application (individually) to a client computer. The backup computer cluster (e.g., the backup computer) generates a virtual machine with the ORACLE database application and a virtual machine with the MICROSOFT EXCHANGE server application. In one embodiment, the primary computer cluster and the backup computer cluster form a VCS global cluster. Therefore, if there is a fault occurs within the primary computer cluster, the client computer is redirected to an appropriate virtual machine that corresponds with a hosted software application that fails over in a seamless transition.

As another example, an ORACLE database application for WINDOWS (i.e., a MICROSOFT WINDOWS operating system) and an ORACLE database application for LINUX are software applications hosted by a first primary computer cluster (e.g., the computer cluster 102) and a second primary computer cluster (e.g., the computer cluster 104). The ORACLE database application for WINDOWS and the ORACLE database application for LINUX are associated with corresponding VCS service groups within the first primary computer cluster and second primary computer cluster, respectively. Furthermore, the backup computer cluster may be use the virtual machine files 124 to generate a first virtual machine for operating the ORACLE database application for WINDOWS and a second virtual machine for operating the ORACLE database application for LINUX. During a failover of the ORACLE database application at the first primary computer cluster and/or the second primary computer cluster, one or more client computers are redirected to the first virtual machine and/or the second virtual machine to achieve high availability and facilitate disaster recovery.

Figure 2:
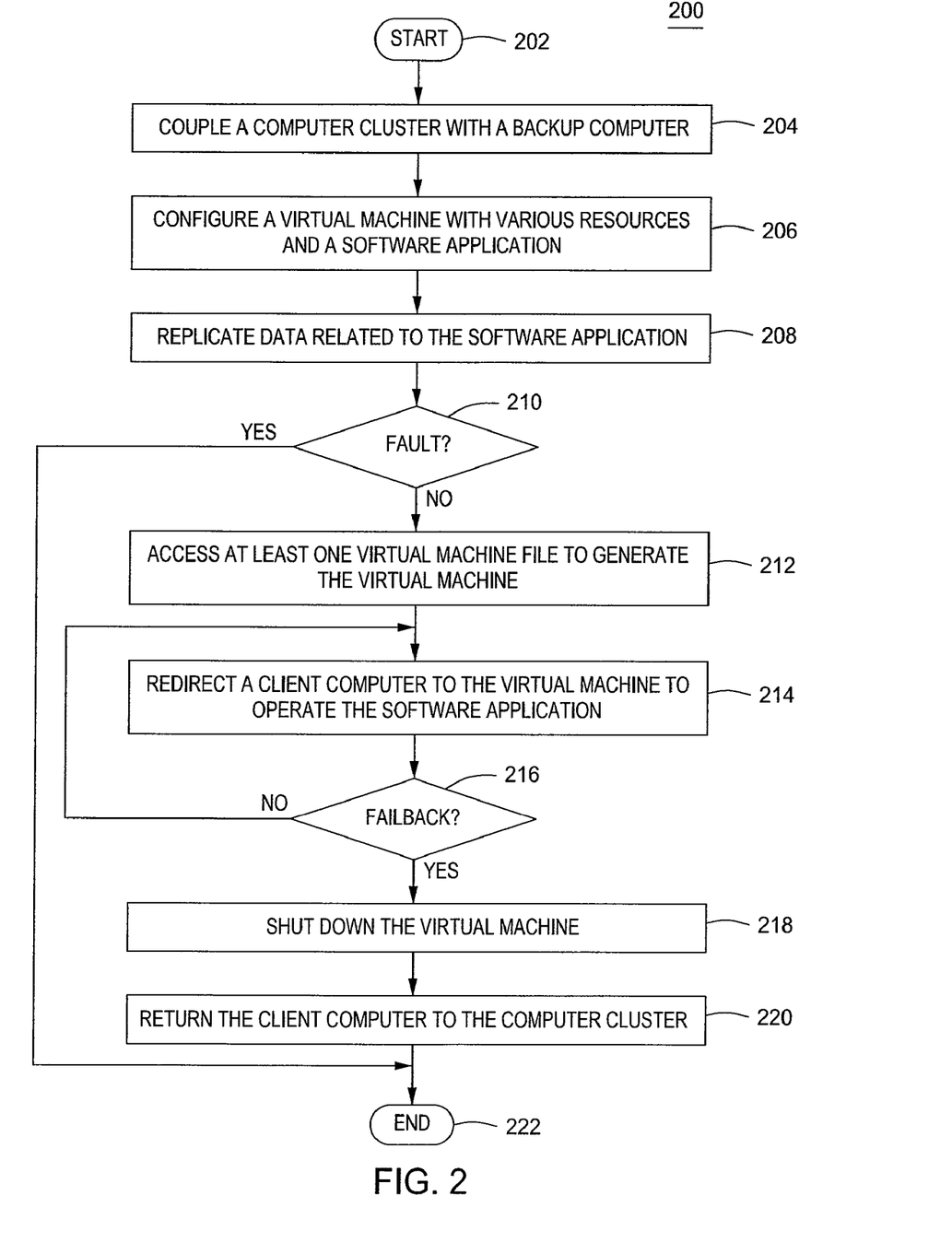
FIG. 2 is a block diagram of a method for failing over a software application to a virtual machine from a physical computing environment in accordance with one or more embodiments of the present invention.

FIG. 2 is a block diagram of a method 200 for failing over a software application to a virtual machine from a physical computing environment according to one embodiment. The method 200 starts at step 202 and proceeds to step 204, at which a computer cluster (e.g., the computer cluster 102 of FIG. 1) is coupled to a backup computer (e.g., the backup computer 106 of FIG. 1).

At step 206, a virtual machine is configured with various computer resources (e.g., hardware and software resources). and the software application. As mentioned above, the various computer resources may be indicated by a service group for providing the software application at the computer cluster to a client computer. At step 208, data related to the software application is replicated to the virtual machine. In one embodiment, the backup computer and the computer cluster form a global cluster (e.g., a VCS global cluster). The global cluster comprises a global service group that is established using the service group at the computer cluster and the virtual machine at the backup computer.

At step 210, a determination is made as to whether a fault occurred at the computer cluster. If, it is determined that a fault has occurred at the computer cluster, the method 200 proceeds to step 212. In one embodiment, a heartbeat is communicated between the computer cluster and the backup computer and may be used by the backup computer to monitor the computer cluster. Generally, the heartbeat indicates a health and/or a state of a computer cluster to multiple computer clusters (e.g., the computer cluster 102, the computer cluster 104 and/or the backup computer 106 of FIG. 1). As such, the heartbeat may be used to determine if a fault has occurred at the computer cluster. At step 212, at least one virtual machine file is accessed (e.g., mounted) to generate the virtual machine to resume the operation of the software application by a client computer of the computer cluster. If, at step 210 it is determined that the fault has not occurred, the method 200 proceeds to step 220 where the method 200 ends.

At step 214, the client computer is redirected to the virtual machine to operate the software application in response to the fault at the computer cluster. At step 216, a determination is made as to whether the software application is to fail back to the computer cluster. If, it is determined that the software application is to fail back to the computer cluster the method 200 proceeds to step 218. At step 218, the virtual machine is shut down. Furthermore, the operation of the software application within the virtual machine is also stopped. At step 220, the client computer is returned to the computer cluster. For example, if the fault at the computer cluster is addressed, then the software application may fail back to the computer cluster from the backup computer. As another example, the system administrator may initiate a process for failing back the software application to the computer cluster. When the fail back process is complete, the client computer may return to using the software application through the computer cluster instead of the backup computer. If, at step 216 it is determined that the software application is not to failback to the computer cluster, the method 200 proceeds to step 214. The method 200 ends at step 220.

Figure 3:
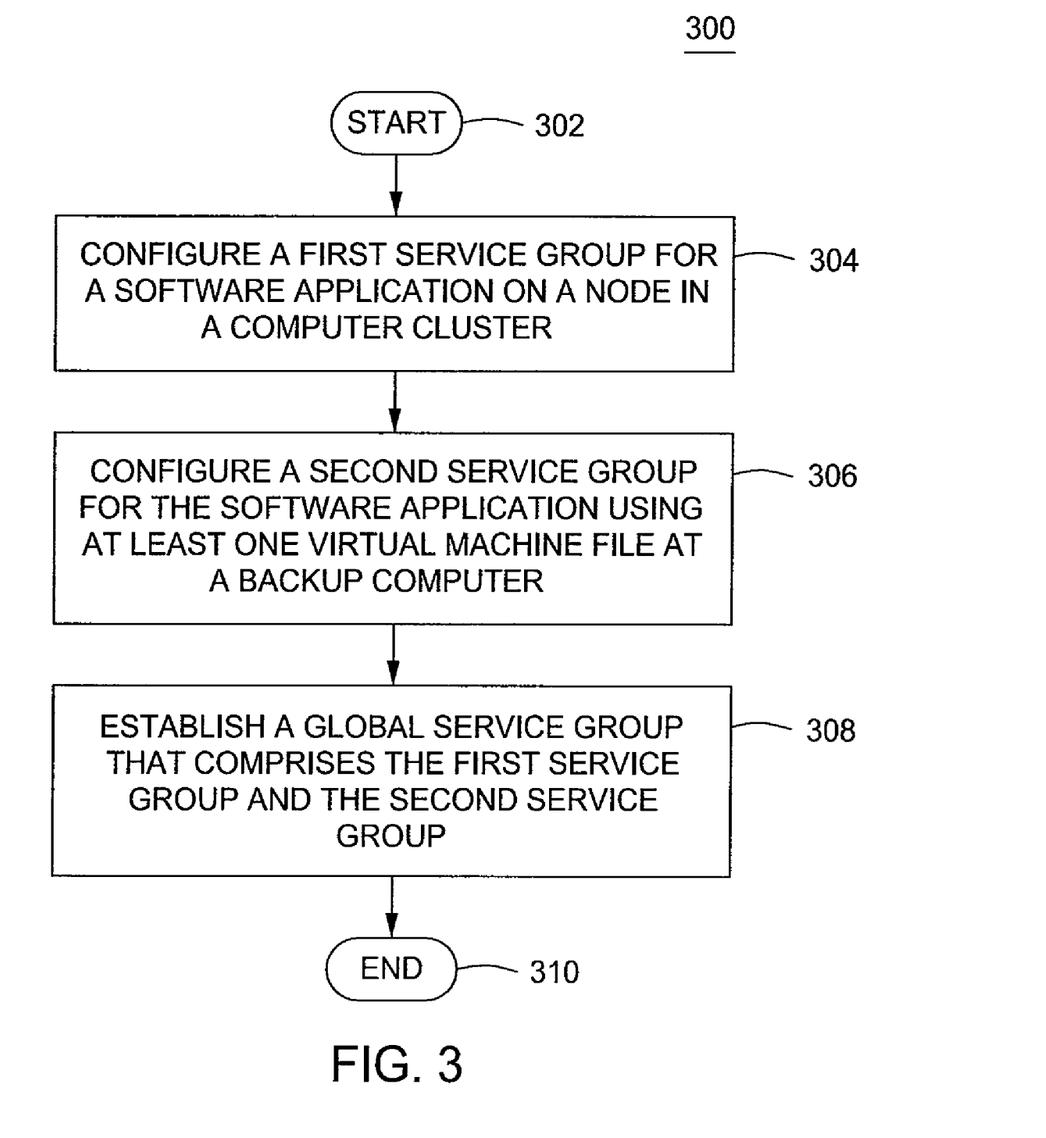
FIG. 3 is a block diagram of a method for creating a global cluster in accordance with one or more embodiments of the present invention.

FIG. 3 is a block diagram of a method 300 for creating a global cluster according to one embodiment. The method 300 starts at step 302 and proceeds to step 304 at which a first service group is configured for a software application on a node (e.g., a client computer) in a computer cluster. At step 306, a second service group is configured for the software application using at least one virtual machine file at a backup computer. At step 308, a global service group is established that comprises the first service group and the second service group. As described above, the global service group may be used to perform a failover process and resume the operation of the software application in response to a fault at the computer cluster. As a result, high availability is achieved for the software application. At step 310, the method 300 ends.

Thus, various embodiments of the present invention have been provided. The inventive methods and apparatus may advantageously provide for failing over a software application to a virtual machine from a physical computing environment to achieve high application availability. In some embodiments, the inventive apparatus advantageously provide cost effective and improved performance. In some embodiment, the inventive apparatus may be utilized to provide multiple virtual machines associated with multiple software applications. In some embodiment, the inventive methods and apparatus advantageously achieve a recovery time objective (RTO).

Figure 4:
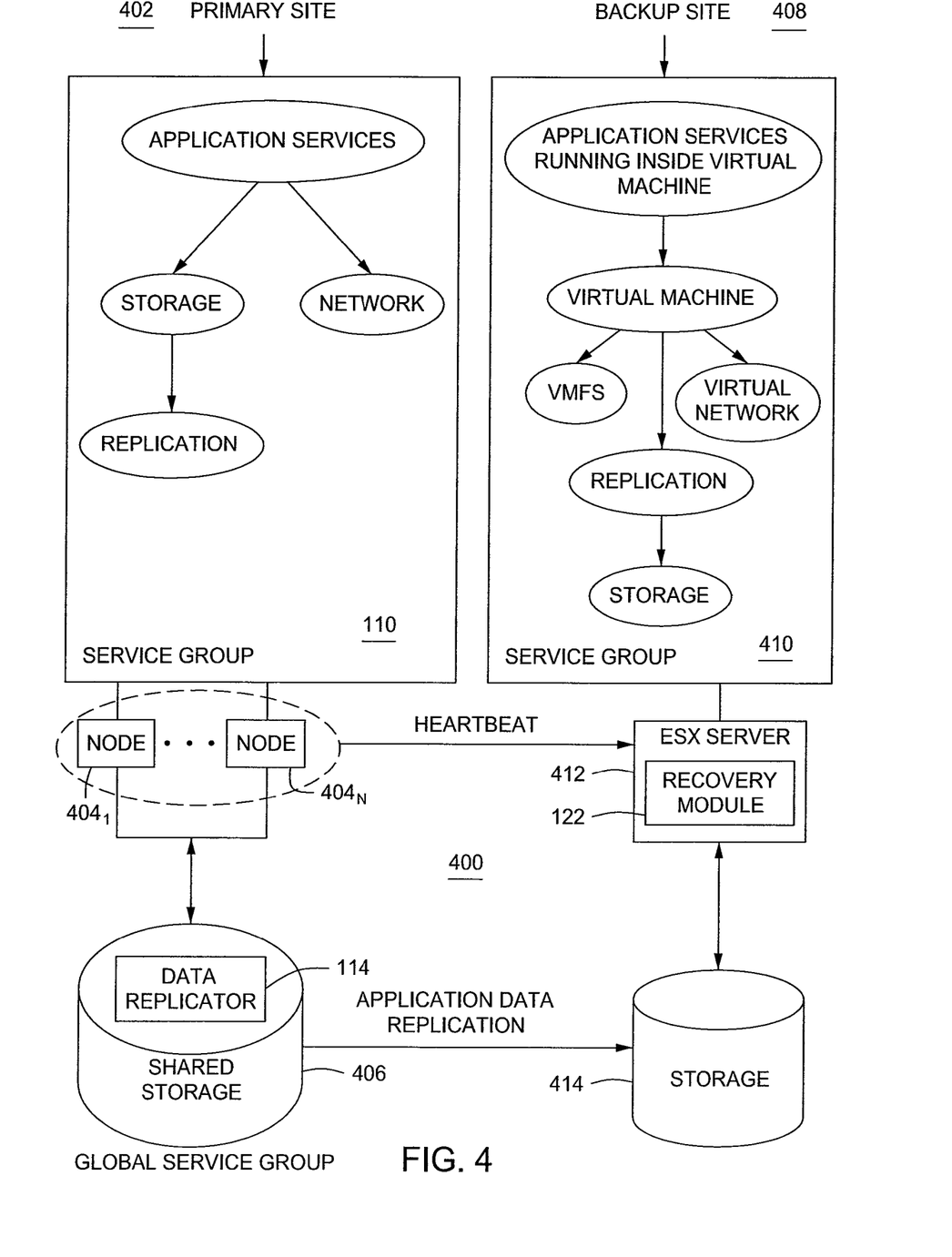
FIG. 4 is a block diagram of a global service group in accordance with one or more embodiments of the present invention.

FIG. 4 is a block diagram of a global service group 400 in accordance with one or more embodiments of the present invention. The global service group 400 comprises various cluster resources at a server cluster at a primary site 402 and a server (e.g., the backup computer 102 of FIG. 1) at a backup site 408 (e.g., the disaster recovery site). In one embodiment, the global service group 400 comprises the service group 110 and a service group 410. The primary site 402 and the backup site 408 may be geographically dispersed.

The computer cluster at the primary site 402 comprises a plurality of nodes 404 and shared storage 406. The plurality of nodes 404 are servers that use the service group 110 to manage software applications (e.g., the software application 112 of FIG. 1). Clustering software at the primary site 402 creates the service group 110 to provide one or more cluster resources to a plurality of client computers, such as application services, storage resources, network resources and replication resources. The one or more cluster resources of the service group 110 are online on any node of the plurality of nodes 404. Coincidentally, one or more cluster resources (e.g., except a virtual network resource) are offline at the service group 410 at the backup site 408. Hence, any virtual machine in the service group 410 is in an offline or powered off state.

A cluster resource may be associated with an agent that brings the cluster resource online or offline. Such an agent also monitors the cluster resource. For example, a virtual machine resource agent is associated with a virtual machine resource. Accordingly, the virtual machine resource agent monitors various states of a virtual machine. When the virtual machine resource is brought online, the virtual machine resource agent registers the virtual machine and runs (e.g., powers on) the virtual machine. When the virtual machine resource is brought offline, the virtual machine shuts down (e.g., powers down).

Generally, the shared storage 406 may be a storage disk array that comprises a plurality of LUNs for storing data for a software application (e.g., the software application 112 of FIG. 1). As described above, the data replicator 114 is a component of a hardware data replication solution. In one embodiment, the data replicator 114 is configured to replicate application data (e.g., data for the software application 112) from a LUN (e.g., a Logical Unit Number for a volume) to a corresponding backup LUN on the backup site 408.

The backup site 408 comprises the service group 410, an ESX server 412 and a storage 414. The service group 410 is similar to the service group 110 and provides the various cluster resources for a software application (e.g., the software application 112), such as application services, a virtual machine, a virtual machine file system (VMFS), replication resources, storage resources and virtual network resources. In one embodiment, the replicated application data on the storage 414 is represented by the storage resources in the service group 410. In another embodiment, one or more virtual machine files for generating the virtual machine are stored on the VMFS. Furthermore, the service group 110 and the service group 410 form the global service group 400.

The ESX server 412 comprises the recovery module 122, which may be a software component for VCS for VMWARE as described above. In one embodiment, the ESX server 412 comprises an installation of one-node VCS for VMWare cluster software in a host operating system (OS) or a console OS. The storage 414 comprises one or more data storage devices. In one embodiment, the storage 414 further comprises software (e.g., a component of a controller for the one or more storage device) that cooperates with the data replicator 114 to store replicated application data from the shared storage 408 of the primary site 402. The replicated application data is stored in the corresponding backup LUN, which is accessed by the recovery module 122 during a failover.

In one embodiment, the plurality of nodes 404 produce and communicate a heartbeat to the ESX server at the backup site 404. Such a heartbeart is established between the computer cluster at the primary site 402 and the backup site 404 in order to detect a fault at the primary site 402 (e.g., a failure of the software application 112 or the plurality of nodes 404). When a disaster strikes the primary site 402 (e.g., the computer cluster is down or the software application faulted on all nodes), the recovery module 122 at the backup site 404 detects the disaster from the heartbeat and brings the various cluster resources online in order to operate the software application 112. The recovery module 122 mounts the virtual machine file system (VMFS), enables read/write access to the replicated data and generates a virtual machine for providing application services. In one embodiment, the recovery module 122 changes the direction of the application data replication to the primary site 402. Hence, any recent application data is replicated to the shared storage 408 during the failover.

When the primary site 402 returns to operation from the disaster, a cluster administrator may initiate a process where the software application 112 fails back to the primary site 402 from the backup site 404. Accordingly, the recovery module 122 stops running the application services (e.g., stops running the software application 112) and shuts down (e.g., powers off) the virtual machine. Then, the recovery module 122 unmounts the VMFS and changes the direction of the application data replication back to the backup site 404. Moreover, the service group 110 is brought back online to provide the plurality of client computers with the various cluster resources.

While the foregoing is directed to embodiments of the present invention, other and further embodiments of the invention may be devised without departing from the basic scope thereof, and the scope thereof is determined by the claims that follow.

The invention claimed is:

1. A method comprising:
    replicating data from a first storage device to a second storage device, wherein
        the replicating is performed prior to occurrence of a fault at a physical computer cluster;
    configuring at least one virtual machine file at a backup computer, wherein
        the configuring is performed prior to occurrence of the fault,
        a software application is hosted by the physical computer cluster,
        the software application accesses the data on the first storage device, and
        the at least one virtual machine file includes a representation of one or more resources of the physical computer cluster for operating the software application;
    in response to occurrence of the fault, generating a virtual machine using the virtual machine file(s), wherein
        the virtual machine is generated at the backup computer,
        after the generating, the backup computer system is operable to execute the virtual machine, and
        the virtual machine is operable to execute an instance of the software application;
    in response to occurrence of the fault,
        executing the virtual machine at the backup computer, and
        executing the instance of the software application by the virtual machine, wherein
            the virtual machine uses the representation of the resource(s), and
            the instance of the software application uses the replicated data on the second storage device; and
    in response to the instance of the software application being executed by the virtual machine, replicating data from the second storage to the first storage.

2. The method of claim 1, wherein
    the backup computer comprises a backup operating system,
    after the generating, the backup computer system is operable to execute the virtual machine using the backup operating system,
    the virtual machine comprises a virtual machine operating system,
    the virtual machine is operable to execute the instance of the software application using the virtual machine operating system,
    the virtual machine operating system is configured to use the replicated resources, and
    the backup operating system does not use the replicated resources.

3. The method of claim 1, further comprising:
    establishing a service group that manages the software application hosted by the physical computer cluster, wherein
    a portion of the at least one virtual machine file maps to a portion of the service group
    the service group comprises the resource(s) for operating the software application.

4. The method of claim 1, wherein
    the physical computer cluster provides one or more client computers with access to the software application, and
    further comprising
        shutting down the virtual machine;
        operating the software application hosted by the physical computer cluster; and
        the client computer(s) accessing the software application hosted by the physical computer cluster.

5. The method of claim 1, wherein
    the at least one virtual machine file further includes a representation of one or more resources for operating a plurality of software applications that includes the software application,
    the resource(s) include one or more of hardware or software resources of the physical computer cluster for operating the software application,
    the plurality of software applications are hosted by a plurality of physical computer clusters,
    the at least one virtual machine file is used to generate a plurality of virtual machines that includes the virtual machine for operating the plurality of software applications, and
    each of the plurality of virtual machines is operable to execute a separate virtual machine operating system for executing the plurality of software applications.

6. The method of claim 1, wherein
    said configuring the at least one virtual machine file preconfigures the at least one virtual machine file with an installation of the software application,
    the software application executes on an operating system of the physical computer cluster,
    the virtual machine operating system is similar to the operating system, and
    the virtual machine is operable to execute the instance of the software application at the backup computer to resume operation of the software application.

7. The method of claim 1, wherein said generating a virtual machine comprises mounting the at least one virtual machine file to generate the virtual machine for operating the configured software application at the backup computer.

8. The method of claim 1, further comprising
    replicating application data used by the software application hosted by the physical computer cluster; and
    storing the replicated application data by the backup computer, wherein
        the software resources comprise application data used by the software application, and
        the using the virtual machine to execute the configured software application further comprises using the replicated application data.

9. The method of claim 1, wherein
    the physical computer cluster provides one or more client computers with access to the software application, and
    further comprising redirecting at least one of the client computer(s) to the configured software application at the backup computer and hosted by the virtual machine.

10. The method of claim 1, further comprising processing a heartbeat from the physical computer cluster that indicates the fault at the physical computer cluster.

11. The method of claim 1, further comprising creating a global service group using an service group for operating the software application at the physical computer cluster and a service group for operating the software application at the backup computer.

12. An apparatus comprising:
a memory comprising at least one virtual machine file that is configured with a software application, wherein
the at least one virtual machine file includes a representation of one or more resources of a physical computer cluster for operating the software application,
the software application is hosted by the physical computer cluster,
the software application accesses data on a first storage device,
the data is replicated from the first storage to a second storage device prior to occurrence of a fault at the physical computer cluster, and
the configuring is performed prior to occurrence of the fault;
a recovery module for:
in response to occurrence of the fault, generating a virtual machine using the virtual machine file(s), wherein
the virtual machine is generated at a backup computer,
after the generating, the backup computer system is operable to execute the virtual machine, and
the virtual machine is operable to execute an instance of the software application; and
accessing the virtual machine file(s) to execute the instance of the software application by the virtual machine, wherein
the virtual machine uses the representation of the resource(s),
the instance of the software application uses the replicated data on the second storage device,
the accessing is performed in response to occurrence of the fault, and
in response to the instance of the software application being executed by the virtual machine, data is replicated from the second storage to the first storage.

13. The apparatus of claim 12, further comprising:
a data replicator module for replicating application data used by the software application hosted by the physical computer cluster; and
storage for storing the replicated application data by the backup computer, wherein
the recovery module is for accessing the virtual machine file(s) to execute the configured software application by further using the replicated application data.

14. The apparatus of claim 12, wherein the recovery module generates the virtual machine by mounting the virtual machine file(s) to generate the virtual machine for operating the configured software application.

15. The apparatus of claim 14, wherein the recovery module produces a service group at the backup computer for managing the software application, wherein the service group comprises the virtual machine.

16. A system comprising:
a plurality of computer clusters, wherein each computer cluster comprises a physical computing environment for using a software application; and
a backup computer, comprising:
a memory comprising at least one virtual machine file that includes a representation of one or more resources of the physical computing environment for operating a software application, wherein
the software application is hosted by at least one of the computer clusters,
the software application accesses data on a first storage device,
the data is replicated from the first storage to a second storage device prior to occurrence of a fault at least one of computer clusters, and
the configuring is performed prior to occurrence of the fault, and
the at least one virtual machine file is configured with the software application; and
a recovery module for:
in response to occurrence of the fault,
generating a virtual machine using the virtual machine file(s), wherein
the virtual machine is generated at the backup computer,
after the generating, the backup computer system is operable to execute the virtual machine, and
the virtual machine is operable to execute an instance of the software application;
and
accessing the at least one virtual machine file to execute the instance of the software application by the virtual machine, wherein
the virtual machine uses the representation of the resource(s),
the accessing is performed in response to occurrence of the fault, and
in response to the instance of the software application being executed by the virtual machine, data is replicated from the second storage to the first storage.

17. The system of claim 16 wherein a portion of virtual machine file(s) maps to a portion of a service group at the physical computer cluster, wherein the service group comprises the resource(s) for operating the software application.

18. The system of claim 16, wherein the backup computer further comprises:
a data replicator module for replicating application data used by the software application hosted by the physical computer cluster; and
storage for storing the replicated application data by the backup computer, wherein
the recovery module is for accessing the virtual machine file(s) to execute the configured software application by further using the replicated application data.

19. The system of claim 16, wherein the recovery module generates the virtual machine by mounting the virtual machine file(s) to generate a plurality of virtual machines for representing at least four physical environments at the plurality of computer clusters.

20. The system of claim 16, wherein the backup computer processes a heartbeat from the at least one of the computer clusters to determine the occurrence of the fault at the at least one of the computer clusters.

* * * * *